United States Patent [19]

Candee

[11] Patent Number: 4,756,656
[45] Date of Patent: Jul. 12, 1988

[54] SECTIONAL DEVICE HANDLING TOOL

[75] Inventor: Clark B. Candee, Monroeville, Pa.

[73] Assignee: The United States of America as represented by the United States Department of Energy, Washington, D.C.

[21] Appl. No.: 835,668

[22] Filed: Mar. 3, 1986

[51] Int. Cl.⁴ .................................. G21C 19/00
[52] U.S. Cl. ..................... 414/146; 285/26; 285/137.1
[58] Field of Search .......... 414/146, 304; 285/24, 285/25, 26, 27, 28, 29, 137.1, 317; 137/614.04; 901/16, 17

[56] References Cited

U.S. PATENT DOCUMENTS

| | | | |
|---|---|---|---|
| 2,510,125 | 6/1950 | Meakin | 285/137.1 X |
| 2,908,511 | 10/1959 | Rogers | 285/317 X |
| 3,171,483 | 3/1965 | Fredd | 285/25 X |
| 3,248,130 | 4/1966 | Knight | 285/137.1 X |
| 3,280,526 | 10/1966 | Pepitone | 285/317 X |
| 3,780,571 | 12/1973 | Wiesner | 901/16 X |
| 3,809,607 | 5/1974 | Murray et al. | 901/17 X |
| 4,286,287 | 8/1981 | Williams . | |
| 4,311,557 | 1/1982 | Kowalski et al. | 414/146 X |
| 4,319,772 | 3/1982 | Weirich et al. | 285/137.1 X |
| 4,367,888 | 1/1983 | Leverberg et al. | 285/28 |
| 4,415,206 | 11/1983 | Hodges | 285/137.1 X |

FOREIGN PATENT DOCUMENTS

| | | | |
|---|---|---|---|
| 687522 | 10/1930 | France | 137/614.04 |
| 1145204 | 3/1985 | U.S.S.R. | 285/24 |

Primary Examiner—Kenneth J. Dorner
Assistant Examiner—Thomas A. Rendos

[57] ABSTRACT

Apparatus for remotely handling a device in an irradiated underwater environment includes a plurality of tubular sections interconnected end-to-end to form a handling structure, the bottom section being adapted for connection to the device. A support section is connected to the top tubular section and is adapted to be suspended from an overhead crane. Each section is flanged at its opposite ends. Axially retractable bolts in each bottom flange are threadedly engageable with holes in the top flange of an adjacent section, each bolt being biased to its retracted position and retained in place on the bottom flange. Guide pins on each top flange cooperate with mating holes on adjacent bottom flanges to guide movement of the parts to the proper interconnection orientation. Each section carries two hydraulic line segments provided with quick-connect-/disconnect fittings at their opposite ends for connection to the segments of adjacent tubular sections upon interconnection thereof to form control lines which are connectable to the device and to an associated control console.

20 Claims, 2 Drawing Sheets

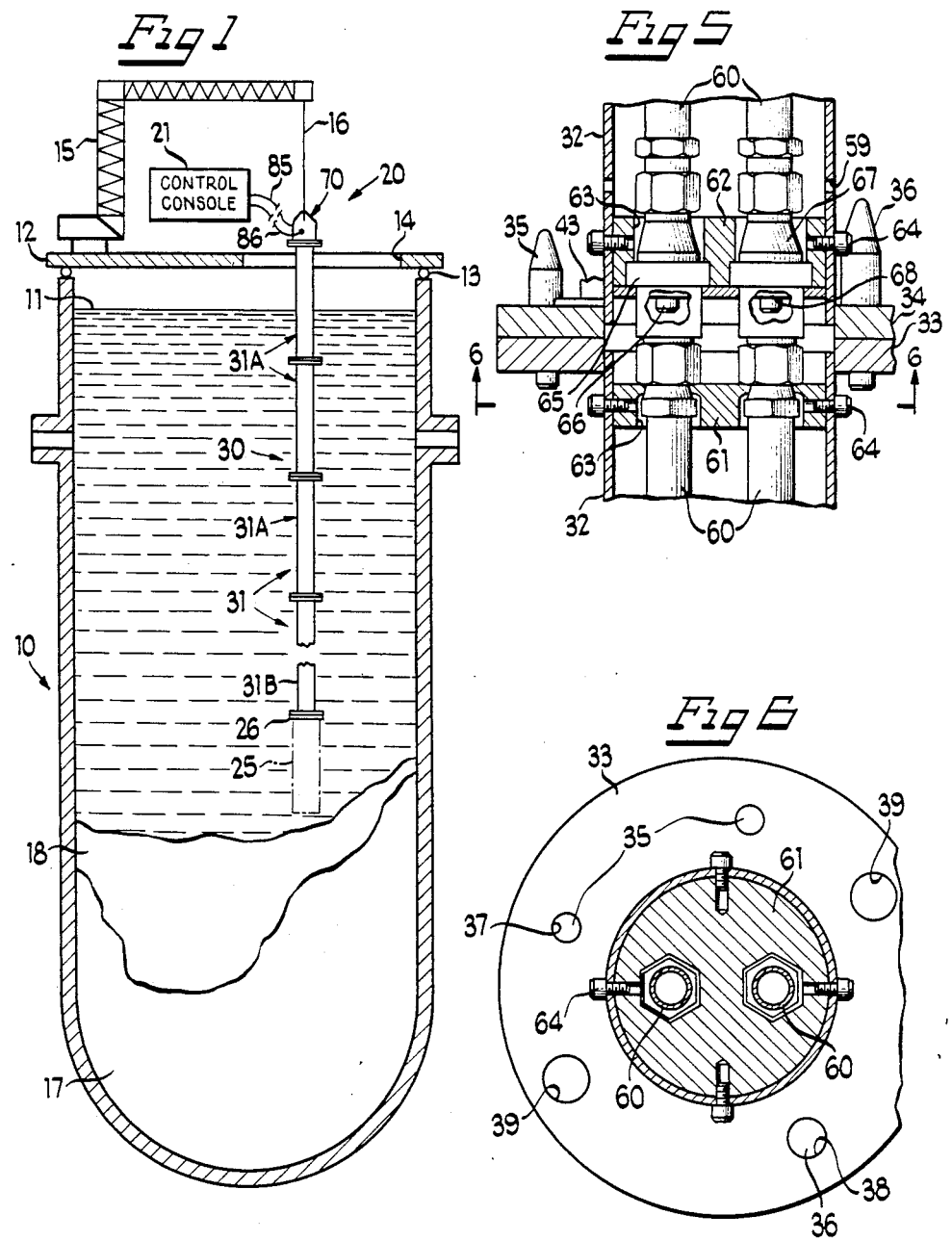

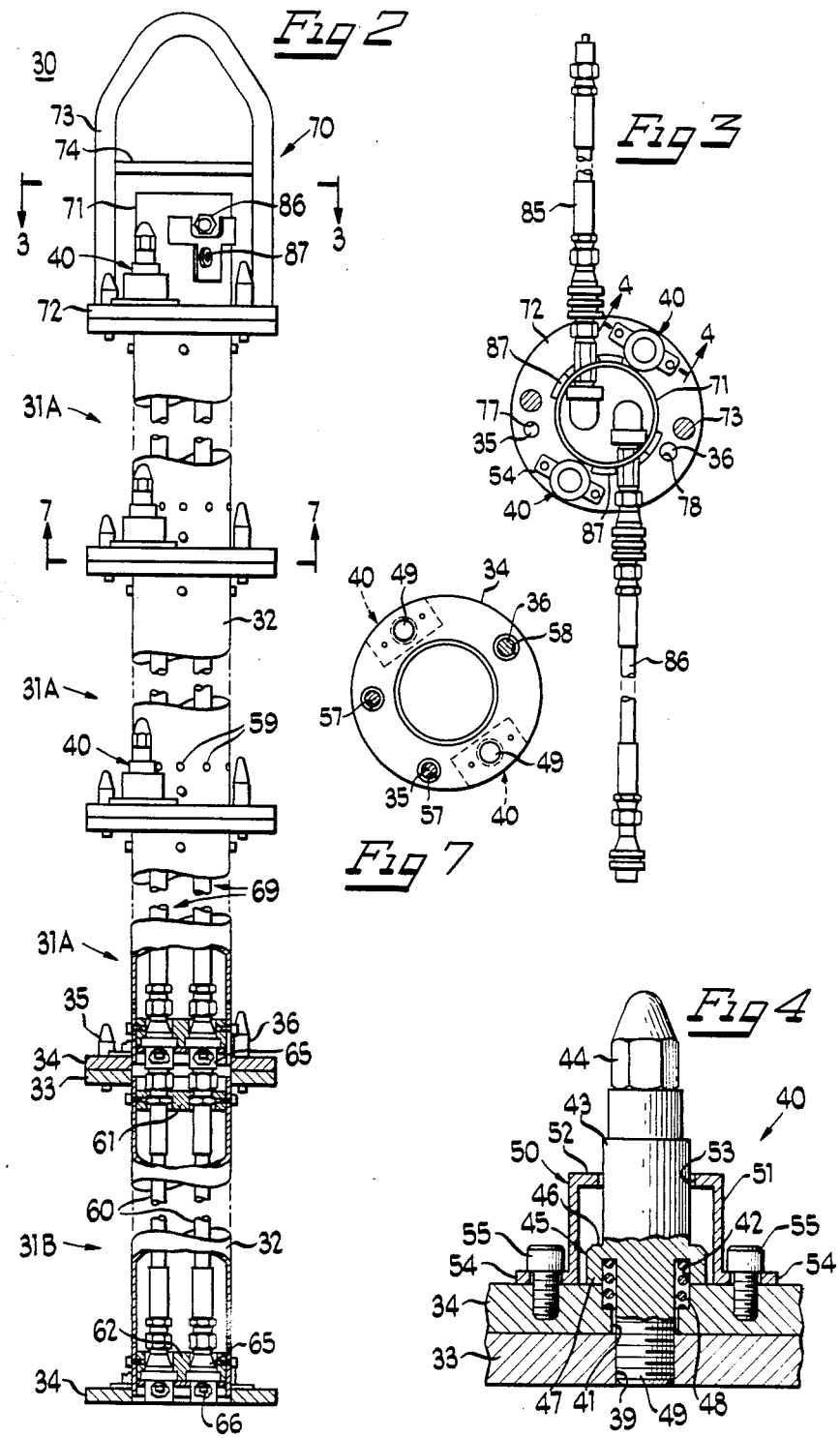

SECTIONAL DEVICE HANDLING TOOL

GOVERNMENT CONTRACT

The invention described herein was made in the course of, or under Contract Number DE-AC07-76D01570 with the United States Department of Energy.

BACKGROUND OF THE INVENTION:

1. Field of the Invention

The present invention relates to apparatus for handling an end effector device or tool from a remote location. The invention relates particularly to apparatus for handling tools in the irradiated underwater environment of a nuclear reactor from a remote location above the water level in the reactor vessel.

2. Description of the Prior Art:

In the event of damage to a nuclear reactor core, it becomes necessary to remove the damaged elements. This operation can be particularly difficult and time consuming in the event that the reactor core has melted and refused. In such a case, it is necessary to remove loose debris from the reactor vessel and to cut away the fused material. To do this, tools such as hydraulic grippers, saws, chisels, and the like must be lowered into the reactor vessel from a remote position, so as to minimize man-rem exposure. Therefore, there must be provided means which will reach the work area from a level approximately 30 feet thereabove.

Since work must also be done at various levels within the core, the device must be readily adjustable in length. Furthermore, in order to minimize man-rem exposure, the device must be remotely adjustable in length in the irradiated underwater environment of the reactor vessel, while providing a control line path between the end effector tool and associated remote control apparatus. In the event of hydraulically controlled end effectors, the handling apparatus must provide fluid-tight seals for all hydraulic connections.

In summary, there is a need for an apparatus operable from a remote location which can be used to position, retrieve and operate various end effector tools at various depths in an irradiated underwater environment. Heretofore, no such apparatus has been available.

SUMMARY OF THE INVENTION

It is a general object of the present invention to provide an improved apparatus for the remote handling of a device in an irradiated underwater environment, which apparatus affords unique structural and operating advantages.

An important feature of the invention is the provision of apparatus of the type set forth which is readily adjustable in length.

In connection with the foregoing feature, another feature of the invention is the provision of a sectional apparatus, the sections of which can be readily connected and disconnected remotely underwater.

Another feature of the invention is the provision of apparatus of the type set forth, which both supports the device and provides control line connections between the device and an associated remote control unit.

Another feature of the invention is the provision of apparatus of the type set forth, which is of relatively compact, simple and economical construction.

These and other features of the invention are attained by providing sectional apparatus for remotely handling a device in an irradiated underwater environment, said apparatus comprising: an elongated structure including one or more elongated structural sections; each of said sections carrying a control line segment, each of said sections including first and second coupling means respectively disposed at opposite ends thereof, each of said first and second coupling means being respectively connectable to second and first coupling means of adjacent sections for interconnecting said sections and the control line segments thereof in end-to-end relationship to form said structure with said control line segments cooperating to form a control line, said second coupling means at one end of said structure being connectable to the associated device for support thereof and for connecting said control line thereto; and support means including a second coupling means connected to said first coupling means at the other end of said structure, said support means including means for connecting said control line to associated control means for controlling the operation of the device.

The invention consists of certain novel features and a combination of parts hereinafter fully described, illustrated in the accompaying drawings, and particularly pointed out in the appended claims, it being understood that various changes in the details may be made without departing from the sprirt, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a view in vertical section of a nuclear reactor vessel in which is mounted a device handling apparatus constructed in accordance with and embodying the features of the present invention;

FIG. 2 is an enlarged side elevational view of the device handling apparatus of FIG. 1, with portions broken away and partially in section, more clearly to illustrate the construction;

FIG. 3 is a view in horizontal section taken along the line 3—3 in FIG. 2;

FIG. 4 is an enlarged fragmentary view in vertical section of one of the coupling mechanisms of the apparatus of FIG. 2;

FIG. 5 is an enlarged fragmentary view in vertical section of the interconnection between two adjacent sections of the apparatus of FIG. 2;

FIG. 6 is a fragmentary view in horizontal section taken along the line 6—6 in FIG. 5; and FIG. 7 is a view in horizontal section taken along the line 7—7 in FIG. 2.

DESCRIPTION OF THE PREFERRED EMBODIMENT

Referring to FIG. 1, there is illustrated a nuclear reactor vessel 10 in which the present invention may be used. The vessel 10 typically includes a reactor core (not shown) and is filled with water to a level 11. A work platform 12 is rotatably supported at the upper end of the vessel 10 by bearings 13, and has an elongated rectangular slot 14 therein to provide access to the interior of the vessel 10. A jib crane 15 may be mounted on the work platform 12 and is provided with a hoist cable 16 suspended in vertical alignment with the slot 14.

In the event that the reactor core becomes damaged in use, there may result an accumulation of debris 17 and a bed 18 of loose materials including gravel, partial fuel rods and pellets and the like at the bottom of the vessel 10. In order to restore the reactor vessel 10 to service, it is necessary to first remove this accumulated bed 18 of loose material and fused debris 17. For this purpose, various tools or end effectors such as saws, chisels, hydraulic grippers and the like must be lowered into the vessel 10 and operated for loosening and removing the accumulated material.

For this purpose, there is provided a tooling system 20 including a control console 21, an end effector device or tool 25, which may be of any of the aforementioned types, provided with an adapter plate 26 for attachment to a handling tool 30, constructed in accordance with and embodying the features of the present invention. The handling tool 30 serves to provide support of the end effector 25 from the crane cable 16 and also serves to provide an interconnection between the end effector device 25 and the control console 21. While the control console 21 is diagrammatically illustrated immediately above the work platform 12, it will be appreciated that it could be disposed at any remote location and, if desired, suitable visual monitoring means (not shown) could be provided.

Referring now also to FIGS. 2 through 7, the handling tool 30 comprises an elongated sectional structure including a plurality of interconnected, elongated structural sections or modules, each generally designated by the numeral 31, and which are substantially identical except for length. Preferably, the structural sections 31 are provided in 7-foot and 15-foot lengths, respectively designated 31A and 31B, and may be used in any combination to reach the desired working depth. In the illustrated embodiment, three of the sections 31A and one of the sections 31B are used to provide an overall length of 36 feet. While the handling tool 30 can be used to support the associated end effector device 25 at virtually any desired depth within the vessel 10, the location of the reactor core is such that, typically, the handling tool 30 will be utilized in lengths of 22, 29 or 36 feet.

Since the structural sections 31 are all substantially identical except for length, only one will be described in detail. Each structural section 31 includes an elongated, circularly cylindrical, tubular body 32, integral at its upper and lower ends, respectively, with radially outwardly extending upper and lower annular flanges 33 and 34. The upper flange 33 is provided with two small guide pins 35 and one large guide pin 36, arranged in a generally triangular pattern and projecting vertically upwardly. The small guide pins 35 are respectively secured in holes 37 in the upper flange 33, while the large guide pin 36 is secured in a hole 38. Preferably, the large guide pin 36 has a length and a diameter which are greater than those of the small guide pins 35, thereby resulting in an asymmetrical arrangement of guide pins 60 for a purpose to be more fully explained below. Also formed through the upper flange 33 are a pair of diametrically spaced-apart, internally threaded coupling bores 39.

Carried by the lower flange 34 are two coupling bolt assemblies 40, respectively disposed in vertical alignment with two bores 41 (one shown in FIG. 4) formed through the lower flange 34 and each having a counterbore portion 42 at the upper end thereof. Each coupling bolt assembly 40 includes an elongated bolt 43 having a hex head 44 and provided intermediate its ends with a flange 45. The flange 45 has a short, radially outwardly extending, annular shoulder portion 46, integral at its outer end with a depending cylindrical portion 47 coaxial with and spaced from a surrounded portion of the bolt 43. A helical compression bias spring 48 is seated in the counterbore portion 42 of the bore 41 so as to encircle the lower end of the bolt 43 when it is inserted downwardly in the bore 41, the spring 48 being trapped vertically against the shoulder portion 46 of the flange 45 and being confined laterally between the bolt 43 and the cylindrical portion 47 of the flange 45. The bolt 43 has an externally threaded lower end 49.

Each coupling bolt assembly 40 also includes a retaining bracket 50 which is generally hat-shaped, having a cylindrical side wall 51, integral at its upper end with a circular end wall 52 having a circular opening 53 formed centrally therethrough. Integral with the cylindrical side wall 51 at its lower end and extending laterally outwardly therefrom at diametrically opposed locations are a pair of attachment flanges 54 adapted to be fixedly secured, as by screws 55, to the upper surface of the lower flange 34.

In use, the retaining bracket 50 is mounted with the opening 53 coaxial with the bore 41 for receiving the upper end of the bolt 43 therethrough. The opening 53 has a diameter less than the outer diameter of the flange 45 to prevent passage of the flange 45 therethrough. Thus, it will be appreciated that, in use, the bolt 43 is reciprocatively axially movable between a retracted position (not shown), wherein the flange 45 is disposed against the end wall 52 of the retaining bracket 50 and no part of the bolt 43 projects below the bottom surface of the lower flange 34, and coupling positions, wherein the lower end of the bolt 43 projects downwardly beneath the lower surface of the lower flange 34. The bias spring 48 resiliently urges the bolt 43 to its retracted position, and movement of the bolt 43 toward its coupling positions is limited by engagement of the flange 45 with the upper surface of the lower flange 34, as illustrated in FIG. 4.

Also provided in the lower flange 34 are two small guide holes 57 (see FIG. 7) and one large guide hole 58 arranged for respectively simultaneously receiving therein the guide pins 35 and 36 of an adjacent structural section 31, as will be explained more fully below. Also formed in the tubular body 32 adjacent to the lower end thereof and spaced circumferentially therearound is a plurality of drain holes 59 for permitting the flow of water between the interior and the exterior of the tubular body 32.

Each of the structural sections 31 also includes a pair of hydraulic control segments 60 disposed therein in side-by-side parallel relationship, each of the segments 60 comprising a section of hydraulic conduit. The control segments 60 are retained in place by upper and lower circular centering plates 61 and 62, having bores 63 (FIG. 5) therethrough for respectively receiving the adjacent ends of the control segments 60. The centering plates 61 and 62 are retained in place by a plurality of circumferentially spaced-apart screws 64 extending radially inwardly through complementary holes in the tubular body 32. Each of the control segments 60 is provided at its upper and lower ends, respectively, with male and female quick-connect/disconnect couplings 65 and 67 of known construction, being respectively provided with normally-closed valves 66 and 68.

It is a significant aspect of the present invention that the structural sections 31 are adapted to be easily joined together and separated remotely in the irradiated underwater environment of the vessel 10. More particularly, in assembling together two of the sections 31, the lower section is supported by suitable means and the upper section is lowered over it to bring the coupling bolts 43 of the upper section 31 respectively into vertical alignment with the internally threaded coupling bores 39 in the lower section 31. In order to facilitate accurate alignment of the coupling bolt assemblies 40, the guide holes 57 and 58 of the upper structural section 31 are respectively lowered over the guide pins 35 and 36. The asymmetrical arrangement of the guide pins and guide holes, with one being larger than the other two, ensures proper orientation of the parts. Furthermore, the fact that the large pin 36 is longer than the small pins 35 permits the upper section 31 to engage the large pin 36 first and then pivot about that pin to the proper orientation for receiving the small pins 35.

When the sections 31 have thus been properly oriented with respect to each other, the upper section 31 is lowered until its lower flange 34 rests upon the upper flange 33 of the lower section 31 in the coupling position illustrated in FIGS. 2 and 4. As the parts are moved to this configuration, the hydraulic control segments 60 of the two structural sections 31 will be disposed in vertical alignment with each other and the male quick-connect/disconnect couplings 65 of the lower section 31 will automatically engage the female quick-connect/disconnect couplings 67 of the upper section 31 in a known manner to provide a firm interconnection therebetween. This interconnection automatically effects opening of the valves 66 and 68, in a known manner, to permit the free flow of hydraulic fluid therethrough.

A suitable torquing tool, such as a socket wrench, may then be lowered into the vessel 10 for engaging the hex heads 44 of the bolts 43 and torquing them into threaded engagement in the coupling bores 39 of the lower section 31, against the urging of the bias spring 48, this rotation of the bolts 43 being limited by engagement of the flange 45 with the upper surface of the lower flange 34, as explained above.

It will be appreciated that the adapter plate 26 of the end effector device 25 is provided with guide pins 35 and 36 and internally threaded coupling bores 39 in the same manner as the upper flanges 33 of the structural sections 31. Thus, the lowermost one of the structural sections 31 can readily be connected to the end effector device 25 in exactly the same manner as was described above for the interconnection of two adjacent structural sections 31. It will be appreciated that the end effector device 25 is also provided with male hydraulic control fittings which are adapted to interconnect automatically with the female quick-connect/disconnect couplings 67 on the lowermost one of the structural sections 31, in the same manner was described above. Additional structural sections 31 are assembled in the same manner as described above until the handling tool 30 has the desired length.

The support section 70 is similar to the structural sections 31, including a tubular body 71 (FIGS. 2 and 3) provided at its lower end with a radially outwardly extending annular attachment flange 72. Integral with the attachment flange 72 and extending upwardly therefrom is an elongated bail 73, the legs of which are spanned by a support rod 74 above the upper end of the tubular body 71. The attachment flange 72 is provided with a pair of small guide holes 77 and a large guide 78 which are substantially identical in shape and arrangement to the guide holes 57 and 58 described above in the lower flange 34 of the structural section 31. Also carried by the attachment flange 72 are two of the coupling bolt assemblies 40 described above. Two hydraulic couplings 85 and 86 have the lower ends thereof disposed within the tubular body 72 for alignment with the control segments 60 of an adjacent structural segment 31. The upper ends of the hydraulic couplings 85 and 86 project laterally outwardly in opposite directions through complementary openings in the tubular body 72, being supported by retainers 87, the hydraulic couplings 85 and 86 being adapted for connection to the associated control console 21.

In use, the support section 70 is coupled to the upper flange 33 of the uppermost one of the structural sections 31, in the same manner as was described above for the interconnection of two adjacent structural sections 31. The bail 73 is supported by the crane cable 16. Thus, it will be appreciated that the interconnected structural sections 31 and the support section 70 cooperate to form the elongated handling tool 30 for support and operation of the associated end effector device 25, the interconnected hydraulic control segments 60 cooperating with the hydraulic couplings 85 and 86 to provide control lines 69 providing communication between the control console 21 and the end effector device 25 for hydraulic operation thereof.

It is another important aspect of the present invention that end effector devices 25 can readily be interchanged on the handling tool 30, without completely removing the handling tool 30 from the reactor vessel 10. In this regard, a new end effector tool 25 is lowered into the vessel 10 and supported in any appropriate manner, either by the lowering device or on a suitable surface in the vessel 10. The bolts 43 in the lowermost one of the structural sections 31 are unscrewed from the end effector adapter plate 26, permitting the handling tool 30 to be pulled apart from the end effector device 25, whereupon it can then be coupled to the new end effector tool 25 in the same manner as was described above. It will be appreciated that, if necessary, any of the interconnected structural sections 31 could also be decoupled in the reactor vessel 10, in the same manner.

In a constructional model of the invention, the tubular bodies 32 of the structural sections 31 are preferably formed of 3-inch diameter stainless steel pipe. In order to reduce radiation streaming up the assembled handling tool 30 and to reduce buoyancy effects, the tubular bodies 32 are filled with borated reactor vessel water during tool immersion, this water being drained through the drain holes 59 when the tool is removed. A hole (not shown) may be provided in the upper centering plate 61 of each of structural section 31 to permit insertion of a hose for flushing of the interior of the tubular body 32 prior to removing the handling tool 30 from the reactor vessel 10.

Preferably, the hydraulic control segments 60 are rated at 4,000 psi working pressure, as are the quick-connect/disconnect couplings 65 and 67. Because of the design of these quick-connect/disconnect couplings 65 and 67, during each disconnection of an end effector device 25 for substituting a different device, approximately 0.32 cubic inches of hydraulic fluid will be released into the reactor vessel 10 and about 0.32 cubic inches of reactor vessel water will be introduced into the end effector handling tool hoses. But at these rates, only about 1.0 gallon of fluid will be exchanged between the reactor vessel and the handling tool hoses with every 725 connect/disconnect operations. It will be appreciated that suitable adapters may be provided for connection to the control console 21 to accommodate different pressure requirements for various end effector devices 25. The total dry weight of the assembled handling tool 30 is approximately 285 pounds, and it has a design load rating of 2,000 pounds in tension and is designed to withstand a lateral load of 135 pounds at the lower end when assembled to a 36 foot length. Preferably, the end effector device 25 has a maximum design pressure rating of 4,000 psi.

While the present invention has been described for a hydraulic control application, it will be appreciated that the principles of the present invention could also be utilized for electrical or pneumatic control applications. In these cases the hydraulic control segments 60 would be replaced with suitable electrical or pneumatic control segments.

From the foregoing, it can be seen that there has been provided an improved handling tool for the remote handling of an end effector device in an irradiated underwater environment, the tool being sectional for selectively varying the length thereof with the sections being connectable and disconnectable remotely underwater to provide support for the end effector device and also to provide a continuous control line between the end effector and the associated control console.

I claim:

1. Sectional apparatus for remotely handling a device in an irradiated underwater environment, said apparatus comprising: an elongated structure including one or more elongated structural sections; each of said sections carrying a control line segment, each of said sections including first and second coupling means respectively mounted at opposite ends thereof, all of said first coupling means being substantially identical to one another, all of said second coupling means being substantially identical to one another, each of said first coupling means being mateable and connectable with each of said second coupling means for interconnecting said sections and the control line segments thereof in end-to-end relationship to form said structure with said control line segments cooperating to form a control line, said second coupling means at one end of said structure being connectable to the associated device for support thereof and for connecting said control line thereto; and support means including said second coupling means connected to said first coupling means at the other end of said structure, said support means including means for connecting said control line to associated control means for controlling the operation of the device.

2. The sectional apparatus of claim 1, wherein each of said structural sections is tubular in shape.

3. The sectional apparatus of claim 2, wherein each of said control line segments is disposed within the corresponding tubular section.

4. The sectional apparatus of claim 1, wherein said structure includes sections of different lengths.

5. The sectional apparatus of claim 1, wherein said support means is adapted to be suspended from an associated support mechanism.

6. The sectional apparatus of claim 1, wherein each of said control line segments comprises a hydraulic fluid conduit.

7. The sectional apparatus of claim 1, wherein each of said sections includes two of said control line segments arranged in parallel relationship.

8. Sectional apparatus for remotely handling a device in an irradiated underwater environment, said apparatus comprising: an elongated structure including one or more elongated structural sections each having first and second attachment flanges respectively fixed to the opposite ends thereof, each of said sections including first and second coupling means respectively mounted on said first and second attachment flanges, each of said first coupling means including an internally threaded opening in said first attachment flange, each of said second coupling means including a bolt carried by said second attachment flange and extending through an opening therein, said bolt being reciprocatively movable axially between a coupling position projecting through and outwardly beyond said second attachment flange and a retracted position wherein no part thereof projects outwardly beyond said second attachment flange, said bolt in the coupling position thereof being adapted for threaded engagement in said opening in said first attachment flange of an adjacent structural section for interconnecting said sections in end-to-end relationship to form said structure, and bias means resiliently urging said bolt toward the retracted position thereof; said second coupling means at one end of said structure being connectable to the associated device for support thereof; and support means including said second coupling means connected to said first coupling means at the other end of said structure.

9. The sectional apparatus of claim 8, wherein each of said second coupling means includes two of said bolts and each of said first coupling means includes two of said internally threaded openings for respectively threadedly receiving said bolts.

10. The sectional apparatus of claim 8, wherein each of said structural sections further comprises retaining means for limiting movement of said bolt toward the retracted position thereof.

11. The sectional apparatus of claim 8, wherein said bias means comprises a helical compression spring disposed coaxially with said bolt.

12. The sectional apparatus of claim 8, wherein each of said structural sections further comprises guide means for guiding movement of adjacent sections accurately into position for engagement of said bolt in said internally threaded opening.

13. The sectional apparatus of claim 12, wherein said guide means comprises guide pins projecting from each of said first attachment flanges and guide holes formed in each of said second attachment flanges for respectively receiving said guide pins.

14. The sectional apparatus of claim 13, wherein said guide holes and said guide pins are arranged asymmetrically for cooperation in only one orientation.

15. Sectional apparatus for remotely handling a device in an irradiated underwater environment, said apparatus comprising: an elongated structure including one or more elongated tubular sections; each of said sections carrying a control line segment, each of said sections having first and second attachment flanges respectively fixed to the opposite ends thereof, each of said sections including first and second coupling means respectively mounted on said first and second attachment flanges, each of said first coupling means including an internally threaded opening in said first attachment flange, each of said second coupling means including a bolt carried by said second attachment flange and extending through an opening therein, said bolt being movable axially between a coupling position projecting through and outwardly beyond said second attachment flange and a retracted position wherein no part thereof projects outwardly beyond said second attachment flange, said bolt in the coupling position thereof being adapted for threaded engagement in said opening in said first attachment flange of an adjacent structural section for interconnecting said sections in end-to-end relationship to form said structure, and bias means resiliently urging said bolt toward the retracted position thereof; each of said control line segments including first and second connecting means respectively fixed to the opposite ends thereof, all of said first connecting means being substantially identical to one another, all of said second connecting means being substantially identical to one another, each of said first connecting means being mateable and connectable with each of said second connecting means for cooperation to form a control line when said tubular sections are interconnected; said second coupling means and said second connecting means at one end of said structure being connectable to the associated device for support thereof and for connecting said control line thereto; and support means including said second coupling means connected to said first coupling means at the other end of said structure, said support means including means for connecting said control line to associated control means for controlling the operation of the device.

16. The sectional apparatus of claim 15, wherein each of said control line segments comprises a hydraulic fluid conduit.

17. The sectional apparatus of claim 15, wherein said first and second connecting means respectively comprise male and female quick-connect/disconnect fittings.

18. The sectional apparatus of claim 17, wherein each of said fittings includes a normally-closed valve adapted to be opened upon interconnection with an associated fitting.

19. The sectional apparatus of claim 15, wherein each of said tubular sections further comprises means for supporting and positioning said control line segment in said tubular section.

20. The sectional apparatus of claim 15, wherein each of said tubular sections has a plurality of openings therein to permit the flow of water therethrough.

* * * * *